United States Patent
Egashira et al.

(10) Patent No.: US 10,458,538 B2
(45) Date of Patent: Oct. 29, 2019

(54) CONTROL APPARATUS

(71) Applicant: HONDA MOTOR CO., LTD., Tokyo (JP)

(72) Inventors: Fumio Egashira, Wako (JP); Yasuyuki Hibino, Wako (JP); Yutaka Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 145 days.

(21) Appl. No.: 15/867,374

(22) Filed: Jan. 10, 2018

(65) Prior Publication Data

US 2018/0202542 A1    Jul. 19, 2018

(30) Foreign Application Priority Data

Jan. 13, 2017    (JP) .................... 2017-004576

(51) Int. Cl.
*B60W 10/10*    (2012.01)
*F16H 61/02*    (2006.01)
(Continued)

(52) U.S. Cl.
CPC ......... *F16H 61/0213* (2013.01); *B60W 10/10* (2013.01); *B60W 30/184* (2013.01); *B60W 30/1884* (2013.01); *B60W 30/18109* (2013.01); *B60W 2510/18* (2013.01); *B60W 2520/105* (2013.01); *B60W 2540/12* (2013.01); *B60W 2710/1005* (2013.01); *F16H 59/44* (2013.01); *F16H 59/48* (2013.01); *F16H 59/54* (2013.01);
(Continued)

(58) Field of Classification Search
CPC .... F16H 59/48; F16H 59/54; F16H 2059/366; B60W 10/10; B60W 30/184; B60W 30/1884; B60W 30/18109; B60W 2510/18; B60W 2520/105; B60W 2540/12; B60W 2710/1005; Y10T 477/647
USPC .......................................... 701/62
See application file for complete search history.

(56) References Cited

U.S. PATENT DOCUMENTS 9,598,082 B2 *    3/2017    Kuroki ................. B60W 10/02
10,214,210 B2 *    2/2019    John ..................... B60W 30/143

FOREIGN PATENT DOCUMENTS

| JP | H5-21142 U | 3/1993 |
| JP | 2004-270734 A | 9/2004 |
| JP | 2012-013051 A | 1/2012 |

OTHER PUBLICATIONS

English translation of JP2012013051; http://translationportal.epo.org; Mar. 25, 2019 (Year: 2019).*
(Continued)

*Primary Examiner* — Roger L Pang
(74) *Attorney, Agent, or Firm* — Thomas | Horstemeyer, LLP

(57) ABSTRACT

A control apparatus for an automatic transmission including a torque converter with a lock-up clutch capable of connecting an output shaft of an engine and an input shaft of the automatic transmission includes a release determination unit configured to determine based on a deceleration and a reference deceleration whether to change an engaging state of an engaging mechanism that constitutes the set gear range of the automatic transmission to a release state when a brake operation is detected, and a control unit configured to control the engaging mechanism based on determination of the release determination unit.

4 Claims, 11 Drawing Sheets

(51) Int. Cl.
 *F16H 59/36* (2006.01)
 *F16H 59/54* (2006.01)
 *F16H 59/48* (2006.01)
 *F16H 59/44* (2006.01)
 *B60W 30/188* (2012.01)
 *B60W 30/18* (2012.01)
 *B60W 30/184* (2012.01)

(52) U.S. Cl.
 CPC .................. *F16H 2059/366* (2013.01); *F16H 2200/0069* (2013.01); *F16H 2200/2012* (2013.01); *F16H 2200/2046* (2013.01); *Y10T 477/647* (2015.01)

(56) References Cited

OTHER PUBLICATIONS

English translation of JP2004270734; http://translationportal.epo.org; Mar. 25, 2019 (Year: 2019).*
Japanese Office Action (w/ partial English translation) issued for Application No. 2017-004576 dated Aug. 27, 2018.

* cited by examiner

FIG. 2A

|      | C1 | C2 | C3 | B1 | B2 | B3 | F1 | GEAR RATIO |
|------|----|----|----|----|----|----|----|------------|
| RVS  |    |    | ○  |    | ○  |    | ○  | 4.008 |
| 1st  |    |    |    | ○  | ○  | (○) | △/○ | 5.233 |
| 2nd  |    | ○  |    | ○  | ○  |    | (△) | 3.367 |
| 3rd  |    |    | ○  | ○  | ○  |    | (△) | 2.298 |
| 4th  |    | ○  | ○  | ○  |    |    | (△) | 1.705 |
| 5th  | ○  |    | ○  | ○  |    |    | (△) | 1.363 |
| 6th  | ○  | ○  | ○  |    |    |    | (△) | 1.000 |
| 7th  | ○  |    | ○  |    | ○  |    | (△) | 0.786 |
| 8th  | ○  | ○  |    |    | ○  |    | (△) | 0.657 |
| 9th  | ○  |    |    |    | ○  | ○  | (△) | 0.584 |
| 10th | ○  | ○  |    |    |    | ○  | (△) | 0.520 |
| P/N  |    |    |    |    |    |    | △/○ | — |
| RPM  | ○  |    | ○  |    |    | ○  | △→○ | — |

FIG. 2B

| PLANETARY GEAR MECHANISM | GEAR RATIO |
|---|---|
| P1 | 2.681 |
| P2 | 1.914 |
| P3 | 1.614 |
| P4 | 2.734 |

FIG. 5

| STEP | ENGAGING OPERATION | | | | | | SHIFT CONDITION |
|---|---|---|---|---|---|---|---|
| | B3 | B2 | B1 | C3 | C2 | C1 | F1 | |
| 1 | – | ↓ | ↓ | – | – | – | △ | COMPLETION OF RELEASE |
| 2 | ○ | – | – | ○ | – | ○ | △ | INPUT ROTATION SPEED ≑ 0 COMPLETION OF ENGAGEMENT OF C1 ETC. |
| 3 | ○ | – | – | ○ | – | ○ | ○ | COMPLETION OF SWITCHING OF F1 |
| 4 | ↓ | ○ | – | – | – | ↓ | ○ | |

↓ : RELEASING
○ : ENGAGE
– : RELEASE
F1/△ : ONE-WAY ROTATION PERMISSION
F1/○ : ROTATION INHIBITION

FIG. 8

| REFERENCE DECELERATION | | REFERENCE VEHICLE SPEED | REFERENCE ROTATION SPEED |
|---|---|---|---|
| ABS NORMAL | ABS ABNORMAL | VRF | NERF |
| DTV 1 | DTV 2 | | |

121

CONTROL APPARATUS

CROSS-REFERENCE TO RELATED APPLICATION

This application is based upon and claims the benefit of priority from the prior Japanese Patent Application No. 2017-004576, filed on Jan. 13, 2017, the entire contents of which are incorporated herein by reference.

BACKGROUND OF THE INVENTION

Field of the Invention

The present invention relates to a control apparatus for an automatic transmission.

Description of the Related Art

Japanese Utility Model Laid-Open No. 5-21142 discloses an arrangement that determines whether a vehicle includes an antilock brake device (ABS device), and performs lockup control of a torque converter depending on the presence/absence of the antilock brake device.

In the technique disclosed in Japanese Utility Model Laid-Open No. 5-21142, since a multiple disc lockup clutch has a large drag torque, engine stall toughness at the time of panic brake can be low.

It is an object of the present invention to provide a control apparatus capable of performing panic neutral control based on a determination criterion set for each of the normal and abnormal states of an ABS device with a large influence on panic brake toughness when performing panic neutral control of changing the engaging state of engaging elements such as a transmission clutch, which constitute a gear range, to a release state at the time of panic brake determination to improve engine stall toughness.

SUMMARY OF THE INVENTION

According to one aspect of the present invention, there is provided a control apparatus for an automatic transmission including a torque converter with a lock-up clutch capable of connecting an output shaft of an engine and an input shaft of the automatic transmission, comprising: a vehicle speed detection unit configured to detect a vehicle speed of a vehicle; a brake detection unit configured to detect presence/absence of a brake operation; a calculation unit configured to calculate a deceleration of the vehicle based on a change in the vehicle speed in a set time in a case in which the brake operation is detected; a state determination unit configured to determine, based on an operation signal from an ABS device, whether the ABS device of the vehicle is in a normally operating state or in a fail state in which the ABS device does not normally operate; a setting unit configured to set a reference deceleration according to the state of the ABS device; a release determination unit configured to determine based on the deceleration and the reference deceleration whether to change an engaging state of an engaging mechanism that constitutes a set gear range of the automatic transmission to a release state when the brake operation is detected; and a control unit configured to control the engaging mechanism based on determination of the release determination unit, wherein if the deceleration is larger than the reference deceleration according to the fail state of the ABS device, the release determination unit determines to change the engaging state of the engaging mechanism to the release state, and if the deceleration is not more than the reference deceleration according to the fail state, or if a reference deceleration according to the normal state of the ABS device is set, the release determination unit determines to hold the engaging state of the engaging mechanism.

According to the present invention, it is possible to perform panic neutral control based on a determination criterion set for each of the normal and abnormal states of an ABS device.

Further features of the present invention will become apparent from the following description of exemplary embodiments (with reference to the attached drawings).

BRIEF DESCRIPTION OF THE DRAWINGS

FIG. 2A is a view showing an example of the engagement table of engaging mechanisms;

FIG. 2B is a view showing the gear ratios of planetary gear mechanisms;

FIG. 5 is a view for explaining the outline of processing performed when the reverse range is selected;

FIG. 8 is a view showing a table in which determination criterion information for panic neutral control is set.

DESCRIPTION OF THE EMBODIMENTS

Figure 1:
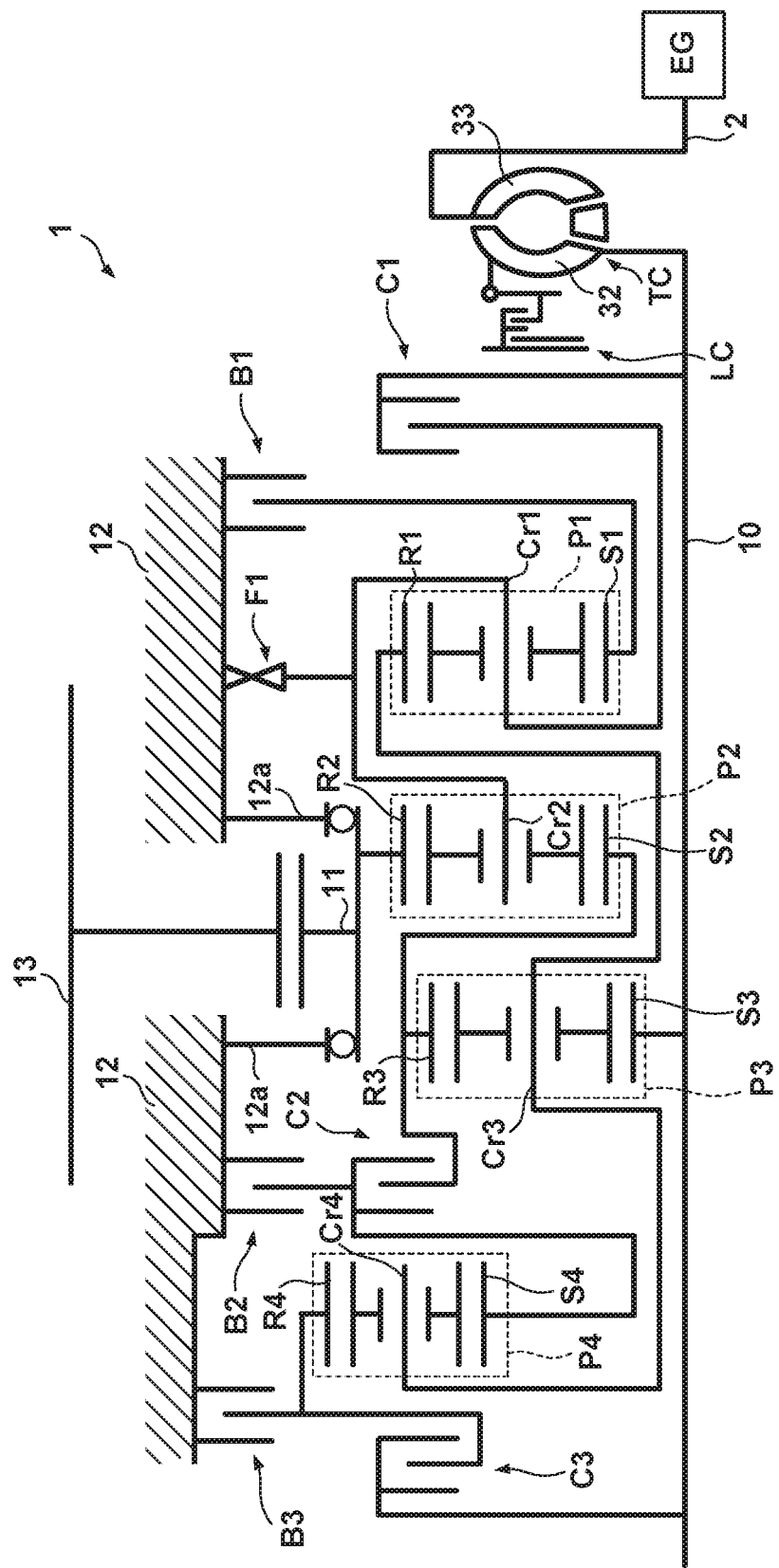
FIG. 1 is a skeleton diagram of an automatic transmission according to an embodiment of the present invention.

FIG. 1 is a skeleton diagram of an automatic transmission 1 according to an embodiment of the present invention. Referring to FIG. 1, the automatic transmission 1 includes an input shaft 10 rotatably axially supported in a casing 12 that forms a transmission case, an output member 11 rotatably supported by support members 12a supported in the casing 12 so as to be coaxial with respect to the input shaft 10, and an output shaft (counter shaft) 13.

A driving force from an internal combustion engine EG (to be sometimes simply referred to as EG) is input to the input shaft 10, and the input shaft 10 is rotated by the driving force. A starting device is provided between the input shaft 10 and the internal combustion engine EG. Examples of the starting device are a clutch type starting device (single disc clutch, multiple disc clutch, or the like) and a hydraulic coupling type starting device (torque converter or the like). In this embodiment, a torque converter TC is provided. Hence, the driving force of the internal combustion engine EG is input to the input shaft 10 via the torque converter TC.

The output member 11 includes a gear concentric to the input shaft 10. The output shaft 13 includes a gear that meshes with the gear. The rotation of the input shaft 10 changes its speed via transmission mechanisms to be described below and is then transmitted to the output shaft 13. The rotation (driving force) of the output shaft 13 is transmitted to driving wheels via, for example, differential gears (not shown).

As the transmission mechanisms, the automatic transmission 1 includes planetary gear mechanisms P1 to P4 and engaging mechanisms C1 to C3, B1 to B3, and F1. In this embodiment, all the planetary gear mechanisms P1 to P4 are single pinion type planetary gear mechanisms. The planetary gear mechanisms P1 to P4 transmit the driving force from the input shaft 10 to the output member 11. The planetary gear mechanisms P1 to P4 can form a plurality of driving force transmission paths. The engaging mechanisms C1 to C3, B1 to B3, and F1 switch the driving force transmission paths of the planetary gear mechanisms P1 to P4, thereby establishing a plurality of gear ranges.

The planetary gear mechanisms P1 to P4 include sun gears S1 to S4, ring gears R1 to R4, and carriers Cr1 to Cr4 each supporting a pinion gear, respectively, as rotational elements (12 in total), and are disposed to be coaxial with respect to the input shaft 10.

When ordered in accordance with the arrangement order at intervals corresponding to gear ratios shown in the velocity diagram of FIG. 3 (to be described later), the sun gear S1, the carrier Cr1, and the ring gear R1 of the planetary gear mechanism P1 can be referred to as a first rotational element, a second rotational element, and a third rotational element in this order.

Similarly, the ring gear R2, the carrier Cr2, and the sun gear S2 of the planetary gear mechanism P2 can be referred to as a fourth rotational element, a fifth rotational element, and a sixth rotational element in this order.

Similarly, the sun gear S3, the carrier Cr3, and the ring gear R3 of the planetary gear mechanism P3 can be referred to as a seventh rotational element, an eighth rotational element, and a ninth rotational element in this order. Similarly, the ring gear R4, the carrier Cr4, and the sun gear S4 of the planetary gear mechanism P4 can be referred to as a 10th rotational element, a 11th rotational element, and a 12th rotational element in this order.

Each of the engaging mechanisms C1 to C3, B1 to B3, and F1 functions as a clutch or a brake. A clutch connects/disconnects the rotational elements provided in the automatic transmission 1. A brake connects/disconnects the rotational elements provided in the automatic transmission 1 to/from the casing 12. The rotational elements provided in the automatic transmission 1 include the input shaft 10 and the sun gears, ring gears, and carriers of the planetary gear mechanisms P1 to P4.

In this embodiment, the engaging mechanisms C1 to C3 are clutches, and the engaging mechanisms B1 to B3 and F1 are brakes. Hence, the engaging mechanisms C1 to C3 are sometimes called the clutches C1 to C3, and the engaging mechanisms B1 to B3 and F1 are sometimes called the brakes B1 to B3 and F1. When the engaging mechanisms C1 to C3 and B1 to B3 are switched between an engaging state (fastening state) and a release state, and the state of the engaging mechanism F1 is switched, the driving force transmission path from the input shaft 10 to the output member 11 is switched, and the plurality of gear ranges are implemented.

In this embodiment, all the engaging mechanisms C1 to C3 and B1 to B3 are assumed to be hydraulic friction engaging mechanisms. Examples of the hydraulic friction engaging mechanism are dry and wet single disc clutches and dry and wet multiple disc clutches.

The engaging mechanism F1 is provided between the casing 12 and predetermined rotational elements (here, the carriers Cr1 and Cr2 connected to each other). The engaging mechanism F1 can be switched between a one-way rotation permission state (to be sometimes referred to as OWC) in which the rotation of the predetermined rotational elements (carriers Cr1 and Cr2) is restricted only in one direction, and rotation in the reverse direction is permitted and a rotation inhibition state (to be sometimes referred to as TWC) in which rotation is restricted in both directions.

In the one-way rotation permission state, the same function as a so-called one-way clutch is implemented. In this state, the rotational elements transmit the driving force in one rotation direction but slip in the reverse direction. In this embodiment, the engaging mechanism F1 functions as a brake. For this reason, if the engaging mechanism F1 is in the one-way rotation permission state, the predetermined rotational elements (carriers Cr1 and Cr2) are permitted to rotate only in one direction. In the rotation inhibition state, the rotational elements transmit the driving force in both rotation directions. In this embodiment, the engaging mechanism F1 functions as a brake. For this reason, if the engaging mechanism F1 is in the rotation inhibition state, the predetermined rotational elements (carriers Cr1 and Cr2) are inhibited from rotating in both directions.

An example of the structure of the engaging mechanism F1 will be described later. For example, a known two-way clutch can be employed. Some known two-way clutches can be switched between the one-way rotation permission state, the rotation inhibition state, and a two-way rotation permission state by driving control of a corresponding hydraulic actuator or electromagnetic actuator. Some known two-way clutches can further switch the one-way rotation permission state between a forward rotation permission state and a reverse rotation permission state. In this embodiment, switching between the one-way rotation permission state and the rotation inhibition state suffices, and using only the permission state in one rotation direction as the one-way rotation permission state suffices. However, a two-way clutch capable of selecting another state such as the two-way rotation permission state may be employed.

The connection relationship between the components will be described next with reference to FIG. 1. The sun gear S3 of the planetary gear mechanism P3 is connected to the input shaft 10. The ring gear R3 is connected to the sun gear S2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 11. Hence, the planetary gear mechanism P2 is a planetary gear mechanism that transmits an input rotation to the output shaft 13.

The clutch C1 connects the input shaft 10 to the carrier Cr1 of the planetary gear mechanism P1 and the carrier Cr2 connected to the carrier Cr1 in the engaging state, and disconnects them in the release state. Note that the release state will sometimes be referred to as a disengaging state. The clutch C2 connects the ring gear R3 of the planetary gear mechanism P3 to the sun gear S4 of the planetary gear mechanism P4 in the engaging state, and disconnects them in the release state. The clutch C3 connects the input shaft 10 to the ring gear R4 of the planetary gear mechanism P4 in the engaging state, and disconnects them in the release state.

The brake B1 connects the casing 12 to the sun gear S1 of the planetary gear mechanism P1 in the engaging state, and disconnects them in the release state. The brake B2 connects the casing 12 to the sun gear S4 of the planetary gear mechanism P4 in the engaging state, and disconnects them in the release state. The brake B3 connects the casing 12 to the ring gear R4 of the planetary gear mechanism P4 in the engaging state, and disconnects them in the release state.

As already described, the engaging mechanism F1 restricts the rotation of the carrier Cr2 of the planetary gear mechanism P2 (and the carrier Cr1 connected to the carrier Cr2) only in one direction in the one-way rotation permission state, and fixes the carrier Cr2 of the planetary gear mechanism P2 (and the carrier Cr1 connected to the carrier Cr2) to the casing 12 in the rotation inhibition state.

FIG. 2A is an engagement table (fastening table) showing the engaging combination of the engaging mechanisms provided in the automatic transmission 1. FIG. 2B shows the gear ratios of the planetary gear mechanisms provided in the automatic transmission 1. FIG. 3 is a velocity diagram of the automatic transmission 1. "Gear ratio" in FIG. 2A indicates the gear ratio between the input shaft 10 and the output member 11.

In this embodiment, 10 forward ranges (1st to 10th) and one reverse range (RVS) can be established. "P/N" represents non-running ranges; "P", a parking range; and "N", a neutral range. "RPM" represents an engaging combination in RVS preparation processing (to be described later). In this processing, the engaging mechanism F1 is switched from the one-way rotation permission state to the rotation inhibition state.

In the example of the engagement table shown in FIG. 2A, "○" indicates the engaging state, and no mark indicates the release state. Note that there are included engaging mechanisms that are set in the engaging state for smooth change to adjacent gear ranges, although the engagement is not essential to establish the gear ranges. For example, in the first range (1st), engagement of the brake B2 is not essential. However, when changing to the reverse range (RVS) or second range (2nd), the brake B2 is set in the engaging state for the purpose of decreasing the engaging mechanisms to switch the engaging state. Similarly, in the fifth range (5th), engagement of the clutch C3 is not essential. However, when changing to the fourth range (4th) or sixth range (6th), the clutch C3 is set in the engaging state for the purpose of decreasing the engaging mechanisms to switch the engaging state.

As for the engaging mechanism F1, "○" indicates the rotation inhibition state, and "Δ" indicates the one-way rotation permission state. In the first range (1st), the engaging mechanism F1 can be set in either the rotation inhibition state or the one-way rotation permission state. In the rotation inhibition state, the engine brake is enabled. In the first range, the engaging mechanism F1 is set in the one-way rotation permission state. The engine brake is switched between the enabled state and a disabled state by engaging or releasing the brake B3. In FIG. 2A, "○" of the brake B3 in the first range (1st) indicates this.

An algorithm to determine which state is set for the engaging mechanism F1 in the first range (1st) can appropriately be designed. In this embodiment, the state before a change to the first range (1st) is inherited. For example, when changed from the reverse range (RVS) to the first range (1st), the engaging mechanism F1 remains in the rotation inhibition state in the first range (1st). However, if, for example, the vehicle speed exceeds a predetermined speed, the engaging mechanism F1 is switched to the one-way rotation permission state. Similarly, when changed from other forward ranges (2nd to 10th) to the first range (1st), the engaging mechanism F1 remains in the one-way rotation permission state in the first range (1st).

In the non-running ranges (P/N) as well, the state of the engaging mechanism F1 can be either the rotation inhibition state or the one-way rotation permission state. In this embodiment, the state before a change to the non-running ranges (P/N) is inherited, as in the first range (1st). In the second range (2nd) to the 10th range (10th), the engaging mechanism F1 is set in the one-way rotation permission state, but slips because of the structure of the automatic transmission 1. For this reason, the state of the engaging mechanism F1 is indicated by "(Δ)".

Figure 3:
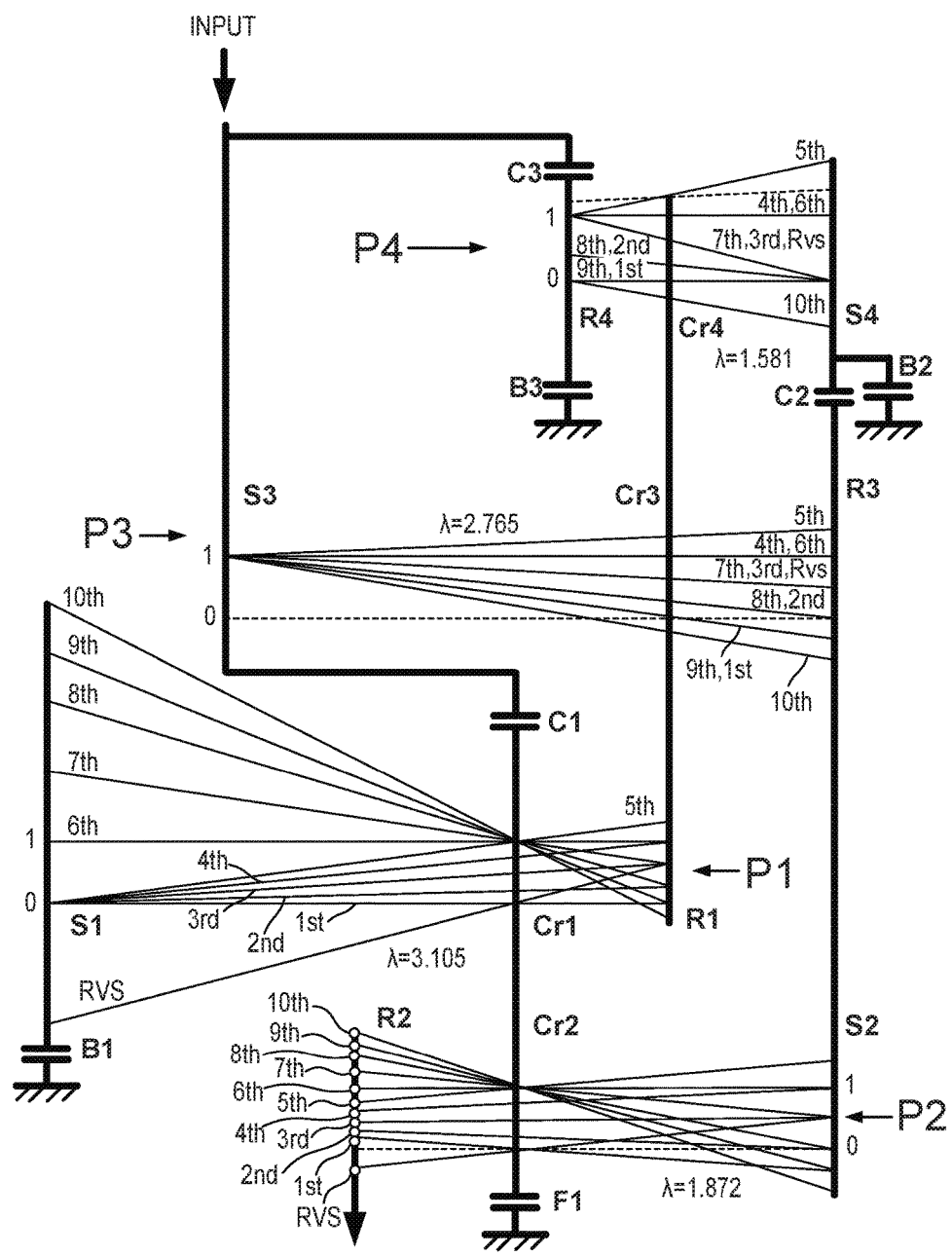
FIG. 3 is a velocity diagram of the automatic transmission shown in FIG. 1.

The velocity diagram of FIG. 3 shows the rotation speed ratio of each element to the input to the input shaft 10 in each gear range. The ordinate represents the speed ratio. "1" indicates the same rotation speed as the input shaft 10, and "0" indicates a stop state. The abscissa is based on the gear ratio between the rotational elements of the planetary gear mechanisms P1 to P4. λ is the gear ratio between a carrier Cr and a sun gear S. Note that in FIG. 3, elements corresponding to the output shaft 13 are not illustrated.

<Control Apparatus>

Figure 4A:
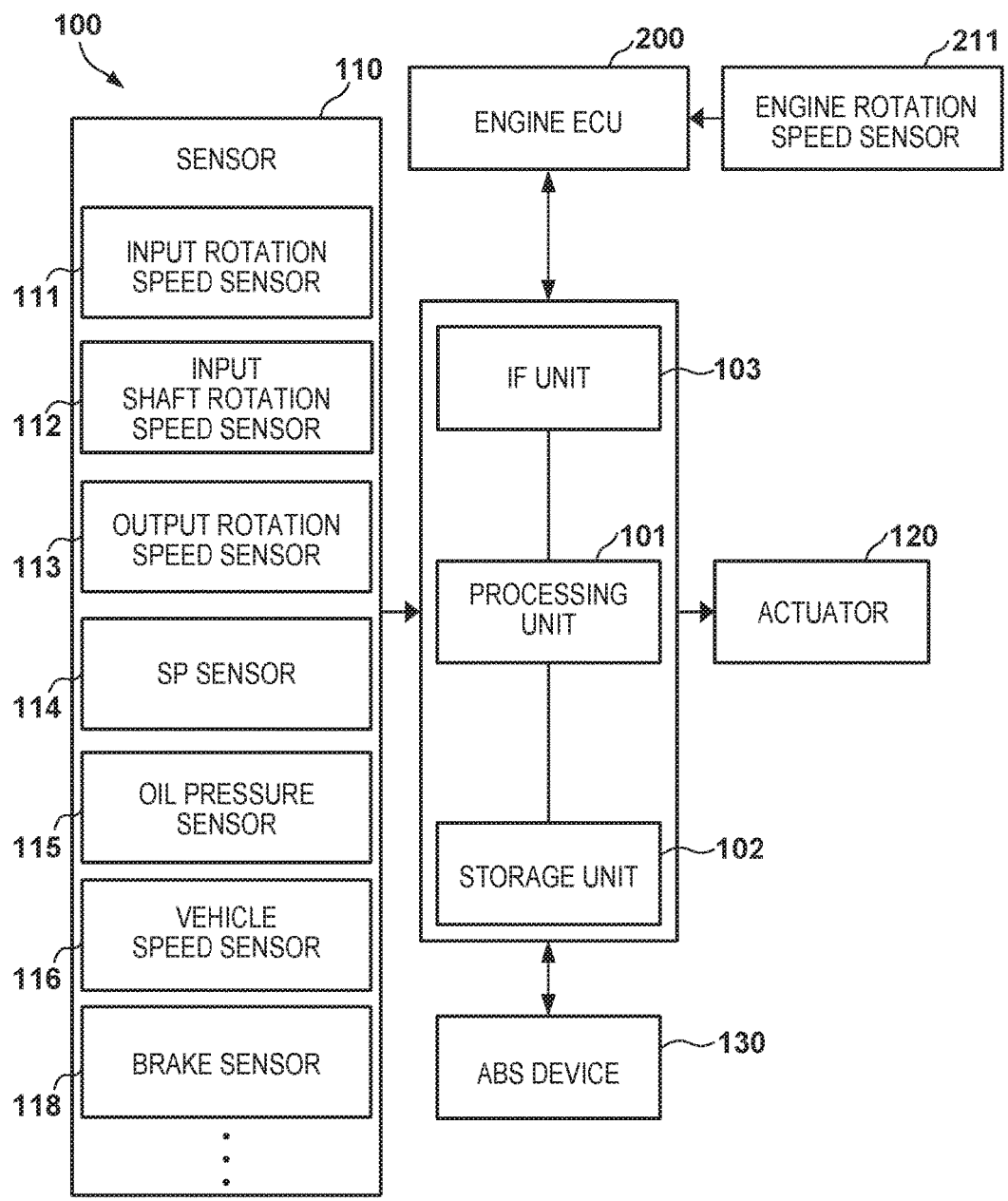
FIG. 4A is a block diagram showing an example of a control apparatus for the automatic transmission shown in FIG. 1.
Figure 4B:
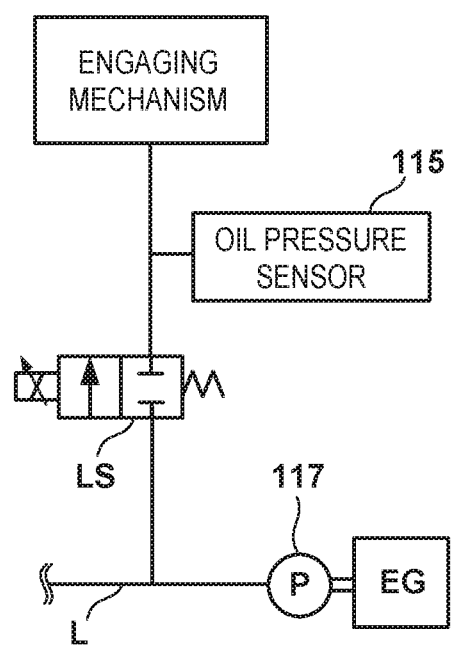
FIG. 4B is a view showing an example of the arrangement of an oil pressure sensor.

FIGS. 4A and 4B are block diagrams of a control apparatus 100 of the automatic transmission 1. The control apparatus 100 of the automatic transmission 1 is implemented by an electronic control unit (ECU) that controls at least the entire automatic transmission. The control apparatus 100 can control the automatic transmission 1 including a lock-up clutch LC and the torque converter TC.

In addition, the engine ECU 200 can control the internal combustion engine EG based on information from sensors. The sensors include an engine rotation speed sensor 211 configured to detect the rotation speed of the internal combustion engine EG. The engine ECU 200 can determine the operation state in the internal combustion engine EG based on the detection result of the engine rotation speed sensor 211. The control apparatus 100 can control not only the automatic transmission 1 but also the internal combustion engine EG. In this embodiment, an engine ECU 200 provided independently of the control apparatus 100 is configured to control the internal combustion engine EG. The control apparatus 100 can receive various kinds of information of the internal combustion engine EG and the vehicle from the engine ECU 200. The control apparatus 100 can also transmit the information of the automatic transmission 1 to the engine ECU 200.

The rotation output of the internal combustion engine EG is output to an engine output shaft 2. The rotation of the engine output shaft 2 is transmitted to the input shaft 10 of the automatic transmission 1 via the torque converter TC. The torque converter TC transmits the rotation torque of the engine output shaft 2 to the input shaft 10 of the automatic transmission 1 via a fluid (hydraulic oil).

The lock-up clutch LC performs lock-up control to connect a pump impeller 33 and a turbine wheel 32 by oil pressure control based on an instruction from the control apparatus 100. In the open state of the lock-up clutch LC, that is, in a state in which the pump impeller 33 and the turbine wheel 32 are not connected, the relative rotation of the pump impeller 33 and the turbine wheel 32 is permitted. In this state, when the rotation torque of the engine output shaft 2 is transmitted to the pump impeller 33, the hydraulic oil filling the torque converter TC circulates from the pump impeller 33 to the turbine wheel 32 along with the rotation of the pump impeller 33. Accordingly, the rotation torque of the pump impeller 33 is transmitted to the turbine wheel 32 to drive the input shaft 10. On the other hand, in the engaging state of the lock-up clutch, the relative rotation of the pump impeller 33 and the turbine wheel 32 is restricted, and the rotation torque of the engine output shaft 2 is directly transmitted to the input shaft 10 of the automatic transmission 1.

The control apparatus 100 includes a processing unit 101 such as a CPU, a storage unit 102 such as a RAM and ROM, and an IF unit 103 that functions as a connecting unit configured to perform communication between an external device or engine ECU and the processing unit 101. The IF unit 103 is formed from, for example, a communication interface or an input/output interface.

The processing unit 101 executes a program stored in the storage unit 102 and controls various kinds of actuators 120 based on the detection results of various kinds of sensors 110. The storage unit 102 stores a table 121 as shown in FIG. 8 in which determination criterion information for panic neutral control is set. In the table 121, a reference deceleration, a reference vehicle speed, and a reference rotation speed of the engine according to the state (normally operating state or fail state) of an ABS device 130 are set.

The various kinds of sensors 110 include various kinds of sensors provided in the automatic transmission 1. FIG. 4A illustrates the following sensors. An input rotation speed sensor 111 detects a rotation speed input from the internal combustion engine EG to the torque converter TC, that is, the rotation speed of the output shaft of the internal combustion engine EG. An input shaft rotation speed sensor 112 is a sensor that detects the rotation speed of the input shaft 10. The slip ratio: ETR of the torque converter TC is calculated by $$ETR(\%)=(\text{rotation speed detected by input shaft rotation speed sensor 112})/(\text{rotation speed detected by input rotation speed sensor 111})\times 100$$

An output rotation speed sensor 113 is a sensor that detects the rotation speed of the output shaft 13.

An SP sensor (shift position sensor) 114 is a sensor that detects a shift position selected by the driver. In this embodiment, four types of shift positions, that is, P range (parking range), D range (forward range), N range (neutral range), and R range (reverse range) are assumed. If the D range is selected, the processing unit 101 can select one of the first range (1st) to the 10th range (10th) in accordance with a gear change map stored in the storage unit 102 and change the gear. If the R range is selected, the processing unit 101 selects the reverse range.

An oil pressure sensor 115 includes a sensor that detects the oil pressure of hydraulic oil in each of the engaging mechanisms C1 to C3 and B1 to B3. A vehicle speed sensor 116 detects the running speed of the vehicle on which the automatic transmission 1 is mounted.

The various kinds of actuators 120 include various kinds of actuators provided in the automatic transmission 1. For example, the actuators 120 include an electromagnetic actuator such as an electromagnetic solenoid that switches the operation state of each of the engaging mechanisms C1 to C3, B1 to B3, and F1. The processing unit 101 thus controls the various kinds of actuators 120.

FIG. 4B shows an example of the arrangement of the oil pressure sensor 115. The oil pressure sensor 115 can be provided for, for example, each of the engaging mechanisms C1 to C3 and B1 to B3. The oil pressure of hydraulic oil in each engaging mechanism can thus be detected. Note that the oil pressure sensor 115 need not always be provided for each engaging mechanism.

A solenoid valve LS for supplying hydraulic oil is assigned to each engaging mechanism. A supply line L of hydraulic oil is opened or closed by the solenoid valve LS, thereby switching the engaging and release states of each engaging mechanism. The oil pressure sensor 115 is provided so as to receive the hydraulic oil supplied from the solenoid valve LS to the engaging mechanism. The detection result of the oil pressure sensor 115 represents the oil pressure of the hydraulic oil supplied to the engaging mechanism. An oil pump 117 driven by the internal combustion engine EG forces the hydraulic oil into the supply line L.

<Switching Control of Engaging Mechanism F1>

In this embodiment, the engaging mechanism F1 is in the rotation inhibition state in the reverse range. When switching from the forward range or non-running range to the reverse range, the engaging mechanism F1 is sometimes switched from the one-way rotation permission state to the rotation inhibition state. At this time, to reduce unusual noise or vibration, the difference between the rotation speed of the engaging mechanism F1 on the side of the casing 12 and that on the side of the carrier Cr2 is preferably 0. In other words, the rotation speed of the carrier Cr2 is preferably 0.

To do this, a combination of engaging mechanisms that changes the rotation speed of the carrier Cr2 to 0 intervenes. In this embodiment, there is no sensor for directly measuring the rotation speed of the carrier Cr2. For this reason, the carrier Cr2 and the input shaft 10 are connected, and it is confirmed from the detection result of the input shaft rotation speed sensor 112 or the like that the rotation speed of the carrier Cr2 is 0. After that, the engaging mechanism F1 is switched to the rotation inhibition state.

FIG. 5 shows the engaging combination of engaging mechanisms when switching the gear range from the first forward range to the reverse range. When the gear range is the first forward range, the brakes B1 and B2 are in the engaging state, as shown in FIG. 2A. The engaging mechanism F1 is assumed to be in the one-way rotation permission state. First, as indicated by step 1 in FIG. 5, the brakes B1 and B2 are controlled to the release state. When release of the brakes B1 and B2 is completed, the process advances to step 2. In step 2, the clutches C1 and C3 and the brake B3 engage. The ring gear R2 and the output shaft 13 are rotatable, and the driving wheels can freely rotate. It is therefore possible to avoid an unexpected behavior of the vehicle.

As is apparent from the velocity diagram of FIG. 3, when the clutch C3 and the brake B3 engage, the input shaft 10 is fixed to the casing 12. When the clutch C1 engages, the carrier Cr2 is connected to the input shaft 10.

Note that in this embodiment, step 2 is performed next to step 1. However, step 1 and step 2 may be performed simultaneously. More specifically, while performing control to set the brakes B1 and B2 in the release state, control to engage the clutches C1 and C3 and the brake B3 may be performed. This can improve responsiveness when switching the gear range to the reverse range.

If predetermined conditions are met, the process advances to step 3. The predetermined conditions are conditions to confirm that the rotation speed of the carrier Cr2 is 0. Basically, the conditions are completion of engagement of the clutch C1 and detection result of input rotation speed sensor 111<predetermined value (for example, a value that can be regarded as 0). As for the completion of engagement of the clutch C1, for example, when the detection result of the oil pressure sensor 115 of the clutch C1 indicates a predetermined oil pressure or when the control amount of the solenoid valve LS for the clutch C1 reaches a predetermined value, it can be determined that engagement is completed. The same determination method can be employed even for completion of engagement of other engaging mechanisms.

In step 3, the engaging mechanism F1 is switched from the one-way rotation permission state to the rotation inhibition state. Since the difference between the rotation speed of the engaging mechanism F1 on the side of the casing 12 and that on the side of the carrier Cr2 is 0, occurrence of unusual noise or vibration can be avoided. When switching of the engaging mechanism F1 is completed, the process advances to step 4. In step 4, the clutch C1 and the brake B3 are released, and the brake B2 engages. The combination for the reverse range thus holds (FIG. 2A).

In some cases, the processing of steps 2 and 3 is called RVS preparation processing, and the processing of step 4 is called RVS in-gear processing. In terms of control, when step 1 is completed, an RVS preparation mode is set. When the RVS preparation mode is set, RVS preparation processing is performed. In addition, when step 3 is completed, an RVS in-gear mode is set as the control state of the gear range. When the RVS in-gear mode is set, RVS in-gear processing is performed. Such mode setting is managed by, for example, providing a mode information storage area in the storage unit 102. An example of processing executed by the processing unit 101 concerning details of control shown in FIG. 5 will be described later with reference to FIGS. 6A and 6B.

Figure 6A:
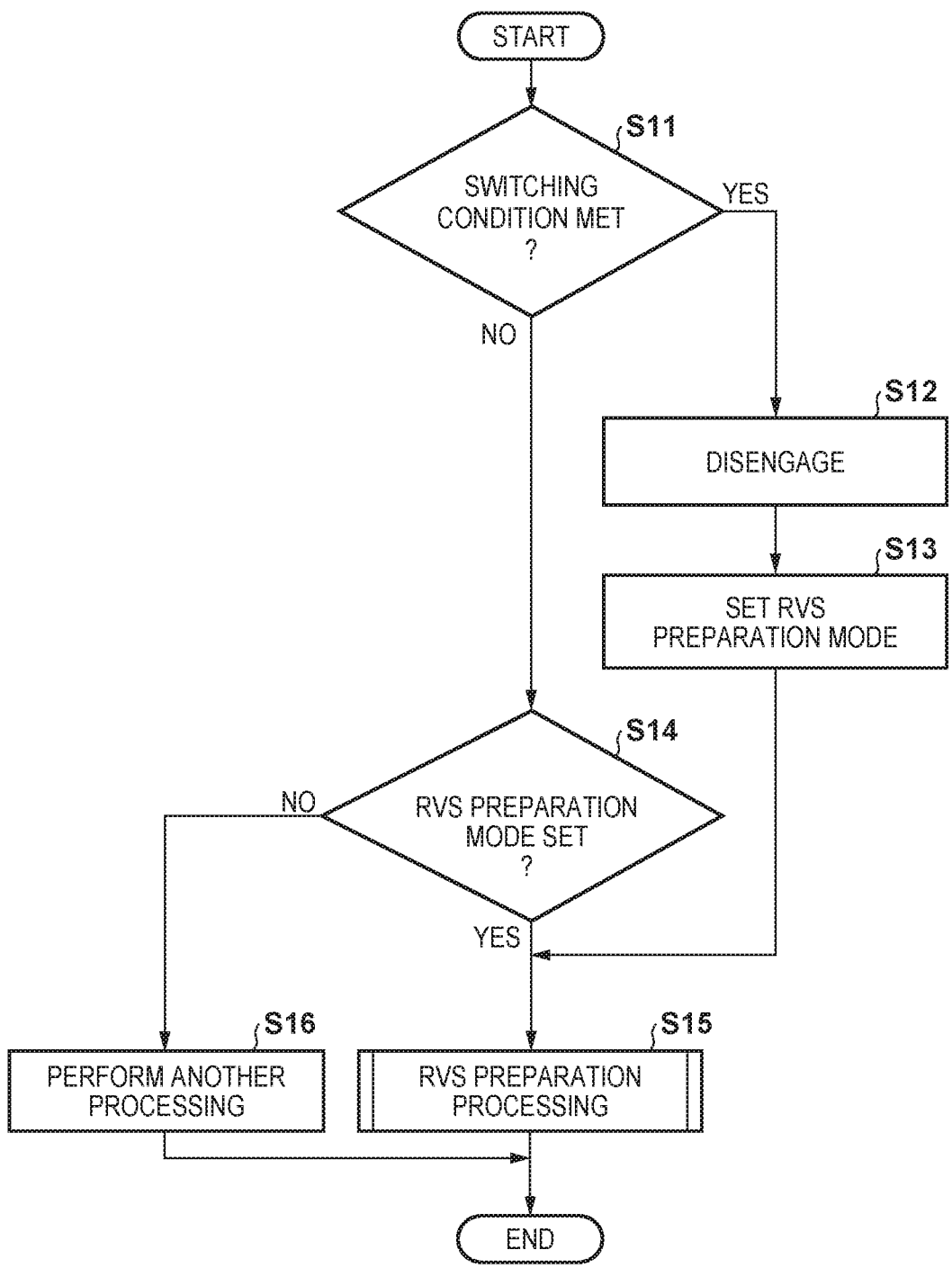
FIGS. 6A and 6B are flowcharts showing an example of processing of the control apparatus shown in FIGS. 4A and 4B.

FIG. 6A will be referred to. In step S11, it is determined whether a condition to switch the engaging mechanism F1 from the one-way rotation permission state to the rotation inhibition state is met. In this embodiment, if the engaging mechanism F1 is in the one-way rotation permission state, and the SP sensor 114 detects that the driver has switched the shift range from another range to the reverse range, it is determined that the condition is met. If YES in step S11, the process advances to step S12. Otherwise, the process advances to step S14.

In step S12, the engaging mechanisms (for example, the brakes B1 and B2) in the engaging state are released, as described concerning step 1 shown in FIG. 5. In step S13, the RVS preparation mode is set as the control mode. After that, the process advances to step S15.

In step S14, it is determined whether the RVS preparation mode is set. If YES in step S14, the process advances to step S15. Otherwise, the process advances to step S16. In step S15, RVS preparation processing is performed. Details will be described later. In step S16, another processing is performed, and the processing of one unit ends.

Figure 6B:
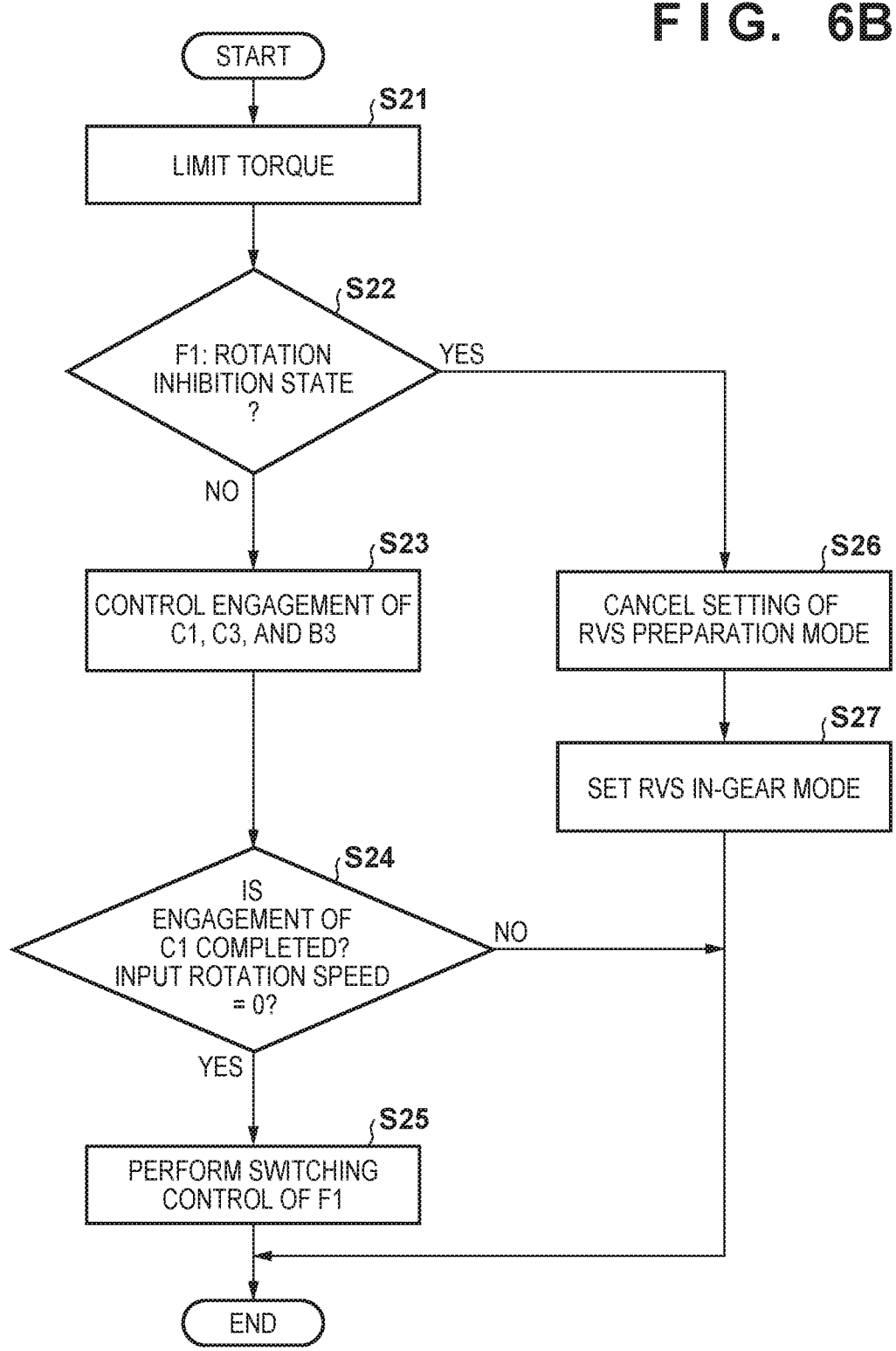

FIG. 6B will be referred to. FIG. 6B is a flowchart showing RVS preparation processing of step S15. In step S21, torque limitation of the driving source of the automatic transmission 1 is executed. For example, the output of the internal combustion engine EG is reduced within the range in which the necessary oil pressures of the engaging mechanisms and the like are ensured.

In step S22, it is determined whether switching of the engaging mechanism F1 to the rotation inhibition state is completed. If YES in step S22, the process advances to step S26. Otherwise, the process advances to step S23.

In step S23, control to engage the clutches C1 and C3 and the brake B3 starts, as described concerning step 2 shown in FIG. 5. The clutches C1 and C3 and the brake B3 can be engaged by increasing the control amounts to the solenoid valves LS of these engaging mechanisms stepwise. When the process of step S23 is repeated a plurality of times, the engagement is completed.

In step S24, it is determined whether engagement of the clutch C1 is completed, and the rotation speed of the input shaft 10 is 0, as described concerning step 2 shown in FIG. 5. If all the conditions are met, the process advances to step S25. If not all the conditions are met, the processing of one unit ends.

In step S25, the state of the engaging mechanism F1 is switched to the rotation inhibition state, as described concerning step 3 shown in FIG. 5. Since the switching is done in a state in which the difference between the rotation speed of the engaging mechanism F1 on the side of the casing 12 and that on the side of the carrier Cr2 is 0, it is possible to prevent occurrence of unusual noise or vibration and avoid breakage of the engaging mechanism F1.

In step S26, setting of the RVS preparation mode is canceled. In step S27, the RVS in-gear mode is set. With this setting, processing of releasing the clutch C1 and the brake B3 and engaging the brake B2 is performed, as described concerning step 4 shown in FIG. 5, in another routine (for example, step S16 in FIG. 6A). The processing thus ends.

<Panic Neutral Control>

Figure 7A:
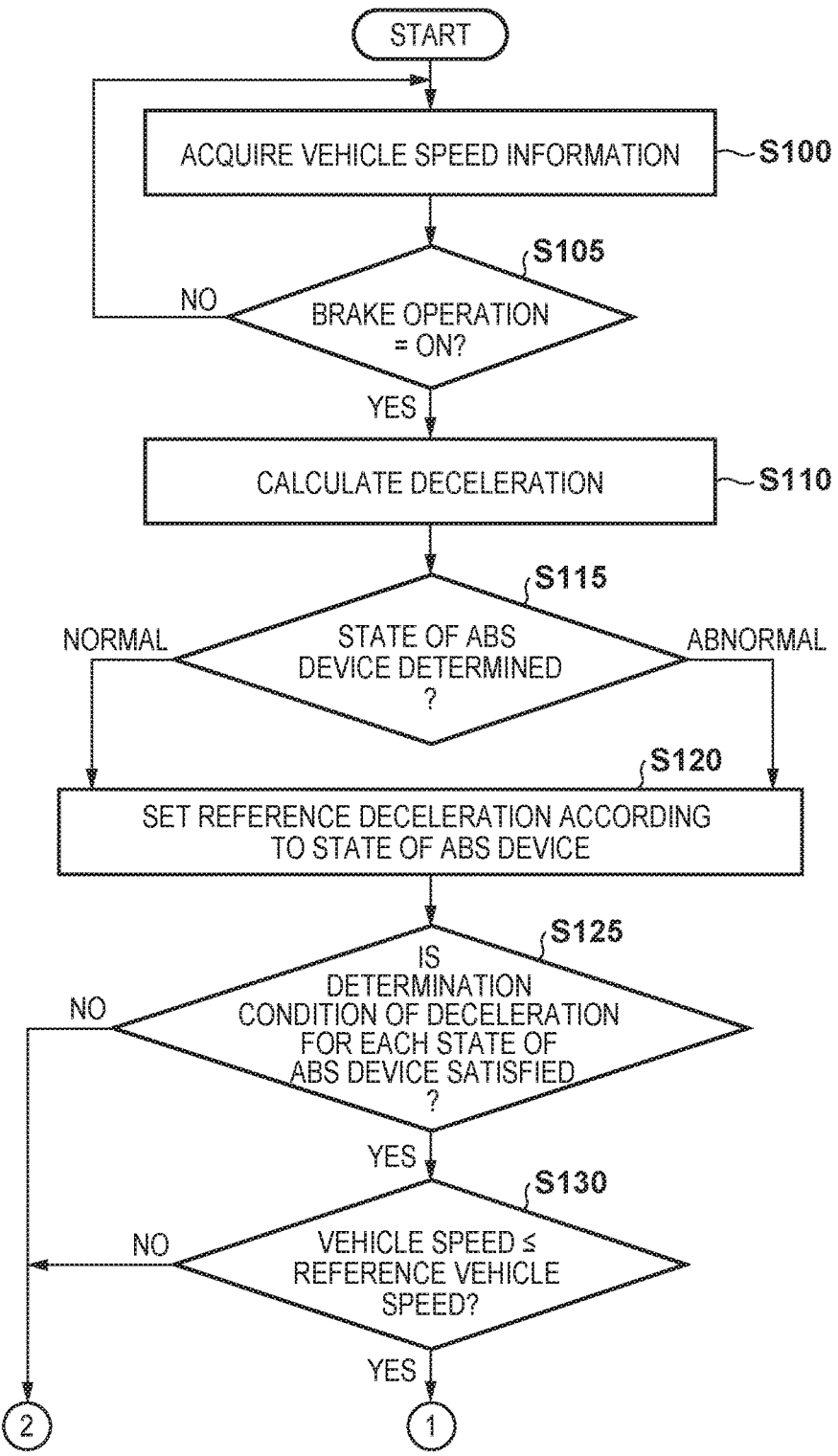
FIGS. 7A and 7B are flowcharts for explaining the procedure of panic neutral control.
Figure 7B:
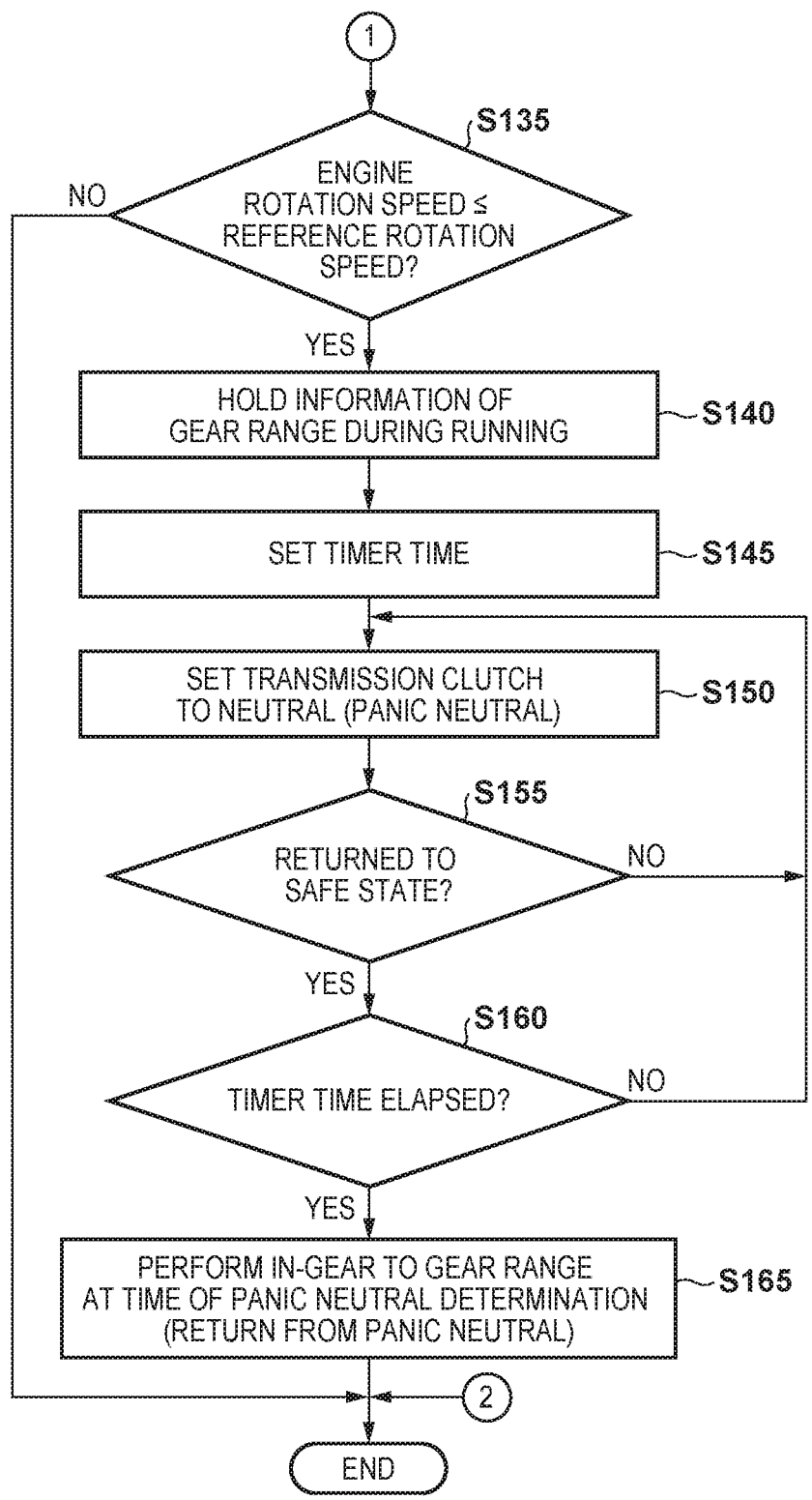

Panic neutral control according to this embodiment will be described. FIGS. 7A and 7B are flowcharts for exemplarily explaining the procedure of panic neutral control according to this embodiment.

In step S100, the control apparatus 100 acquires the running speed (vehicle speed information) of the vehicle from the vehicle speed sensor 116. The vehicle speed sensor 116 detects the running speed of the vehicle on which the automatic transmission 1 is mounted. The detection result of the vehicle speed sensor 116 is input to the control apparatus 100 in accordance with a predetermined sampling time. The control apparatus 100 acquires the vehicle speed information based on the detection result of the vehicle speed sensor 116.

In step S105, the control apparatus 100 monitors a signal from a brake sensor 118 (brake detection unit) and waits until a brake signal is detected (NO in step S105). If the brake sensor 118 detects a brake operation, and a brake signal is input to the control apparatus 100 in step S105 (YES in step S105), the control apparatus 100 advances the process to step S110.

In step S110, the control apparatus 100 calculates the deceleration of the running speed of the vehicle. The control apparatus 100 functions as a calculation unit configured to calculate the deceleration of the vehicle based on a change in the vehicle speed in a set time in a case in which the brake operation is detected. The timer of the processing unit 101 of the control apparatus 100 can measure a time based on a control signal of the processing unit 101. If the brake signal from the brake sensor 118 is input to the control apparatus 100, the processing unit 101 activates the timer based on the input of the brake signal. The control apparatus 100 calculates the change amount (change rate) of the running speed of the vehicle as a deceleration based on the running speed of the vehicle acquired from the vehicle speed sensor 116 when a predetermined time has elapsed and the running speed of the vehicle acquired in step S100.

In step S115, the control apparatus 100 determines, based on the presence/absence of an operation signal from the antilock brake device (ABS device) 130, whether the ABS device 130 is in a normally operating state or in a fail state. The control apparatus 100 functions as a state determination unit configured to determine, based on the operation signal from the ABS device 130, whether the ABS device 130 of the vehicle is in the normally operating state or in the fail state in which the ABS device 130 does not normally operate. If the ABS device 130 is normally operating, the ABS device 130 outputs the operation signal to the control apparatus 100. If the ABS device 130 malfunctions (fail state), the ABS device 130 does not output the operation signal to the control apparatus 100. Upon receiving the operation signal from the ABS device 130, the control apparatus 100 determines that the ABS device 130 is normally operating. If the operation signal is not received, the control apparatus 100 determines that the ABS device 130 is in the fail state in which the ABS device 130 is not normally operating.

In step S120, the control apparatus 100 functions as a setting unit configured to set a reference deceleration according to the state of the ABS device 130. The control apparatus 100 refers to the table 121 (FIG. 8) in the storage unit 102 and sets the reference deceleration according to the state of the ABS device 130. The storage unit 102 stores, for example, the table 121 as shown in FIG. 8 in which determination criterion information for panic neutral control is set. If the ABS device 130 is normally operating (normal in step S115), the control apparatus 100 sets a deceleration DTV1 in the ABS normal state as the reference deceleration. If the ABS device 130 fails (abnormal in step S115), the control apparatus 100 sets a deceleration DTV2 in the ABS abnormal state as the reference deceleration.

In step S125, the control apparatus 100 functions as a release determination unit configured to determine based on the deceleration and the reference deceleration whether to change the engaging state of the engaging mechanisms that constitute the set gear range of the automatic transmission 1 to the release state when the brake operation is detected. The control apparatus 100 determines based on the deceleration calculated in step S110 and the reference deceleration set in step S120 whether the determination criterion of the deceleration is satisfied. If the deceleration DTV1 in the ABS normal state is set as the reference deceleration, the control apparatus 100 determines that the determination criterion of the deceleration is not satisfied (NO in step S125), and ends the processing. This enables to control not to execute panic neutral control of releasing the engaging elements such as a transmission clutch and a brake in a case in which the ABS device 130 with high panic brake toughness normally operates.

If the deceleration DTV2 in the ABS abnormal state is set as the reference deceleration, the control apparatus 100 compares the deceleration calculated in step S110 with the deceleration DTV2 in the ABS abnormal state. If the deceleration calculated in step S110 is equal to or smaller than the reference deceleration (equal to or smaller than the deceleration DTV2) set in step S120 (NO in step S125), the control apparatus 100 determines to hold the engaging state of the engaging mechanisms and ends the processing. On the other hand, if it is determined in step S125 that the deceleration calculated in step S105 is larger than the reference deceleration (deceleration DTV2), the control apparatus 100 determines that the determination criterion of the deceleration is satisfied (YES in step S125), and advances the process to step S130. It is therefore possible to use panic neutral control only in the abnormal state of the ABS device 130 with low panic brake toughness.

In step S130, the control apparatus 100 acquires the running speed (vehicle speed information) of the vehicle based on the detection result of the vehicle speed sensor 116. In addition, the control apparatus 100 refers to the table 121 (FIG. 8) in the storage unit 102 and acquires a reference vehicle speed VRF. The control apparatus 100 compares the running speed (vehicle speed information) of the vehicle acquired from the vehicle speed sensor 116 with the reference vehicle speed VRF. If the running speed (vehicle speed information) of the vehicle is higher than the reference vehicle speed VRF (NO in step S130), the control apparatus 100 determines to hold the engaging state of the engaging mechanisms and ends the processing. On the other hand, if it is determined in step S130 that the running speed (vehicle speed information) of the vehicle is equal to or lower than the reference vehicle speed VRF (YES in step S130), the process advances to step S135.

In step S135, the control apparatus 100 acquires the rotation speed (engine rotation speed) of the internal combustion engine EG based on the detection result of the engine rotation speed sensor 211. In addition, the control apparatus 100 refers to the table 121 (FIG. 8) in the storage unit 102 and acquires a reference rotation speed NERF. The control apparatus 100 compares the rotation speed (engine rotation speed) of the internal combustion engine EG acquired from the engine rotation speed sensor 211 with the reference rotation speed NERF. If the rotation speed (engine rotation speed) of the internal combustion engine EG is higher than the reference rotation speed NERF (NO in step S135), the control apparatus 100 determines to hold the engaging state of the engaging mechanisms and ends the processing. On the other hand, if it is determined in step S135 that the rotation speed (engine rotation speed) of the internal combustion engine EG is equal to or lower than the reference rotation speed NERF (YES in step S135), the process advances to step S140.

By the determination processes of steps S130 and S135, the control apparatus 100 can control the automatic transmission 1 not to execute panic neutral control in a running state with a high vehicle speed (vehicle running speed > reference vehicle speed VRF) and a high engine rotation speed (engine rotation speed > reference rotation speed NERF) without the necessity of panic neutral control.

In step S140, the control apparatus 100 holds the information of the gear range during running. In this step, first, the control apparatus 100 determines which gear range is set in the automatic transmission 1. For example, in case in which the SP sensor 114 selects the D range, the processing unit 101 of the control apparatus 100 can select one of the first range (1st) to the 10th range (10th) in accordance with the gear change map stored in the storage unit 102 and change the gear. If the brake operation is detected during running, the processing unit 101 of the control apparatus 100 stores the set gear range of the automatic transmission 1 and the engaging state of the engaging mechanisms that constitute the gear range in the storage unit 102. For example, if the vehicle is running in the sixth range (6th), the processing unit 101 of the control apparatus 100 stores information representing the sixth range (6th) in the storage unit 102 as the information of the gear range during running. Since the clutches C1, C2, and C3 are in the engaging state in the sixth range (6th), as shown in FIG. 2A, the processing unit 101 of the control apparatus 100 also stores information representing that the transmission clutches (C1, C2, and C3) are in the engaging state in the storage unit 102 as the information of the gear range.

In step S145, the control apparatus 100 sets a timer time. If the timer time is set, the timer (time measuring unit) of the processing unit 101 measures the set timer time.

In step S150, the control apparatus 100 functions as a control unit configured to control the engaging mechanisms based on the determination in step S125 or the like. In a case in which the determination condition in step S125 or the like is satisfied, the control apparatus 100 changes the engaging mechanisms (a transmission clutch and a brake) that constitute the set gear range of the automatic transmission 1 to neutral (release state) when the brake operation is detected by the brake sensor 118 (brake detection unit) during running. For example, as shown in FIG. 2A, in the sixth range (6th), the transmission clutches (C1, C2, and C3) serving as the engaging mechanisms are in the engaging state. In this step, the control apparatus 100 disengages the transmission clutches and sets them in the release state.

If the gear range is the fifth range (5th), the engaging mechanisms (C1, C3, and B1) are in the engaging state. In a case in which the determination condition in step S125 or the like is satisfied, the control apparatus 100 disengages the engaging mechanisms (C1, C3, and B1) and sets them in the release state.

In step S155, the control apparatus 100 determines whether the vehicle is returned to a safe state. The control apparatus 100 determines whether, for example, the brake operation in step S105 is continued, and the determination condition in step S125 is satisfied. If the brake operation is continuously performed based on the detection result of the brake sensor 118, and the determination condition in step S125 is satisfied, the control apparatus 100 determines that the vehicle is not returned to the safe state. That is, if the brake operation is continued, the control apparatus 100 determines to continue the state of the engaging mechanisms controlled to the release state (NO in step S155), and returns the process to step S150. If the brake sensor 118 detects the brake operation during running, the control apparatus 100 executes panic neutral control so as to continue the state to set the engaging mechanisms that constitute the set gear range of the automatic transmission 1 to neutral (release state).

On the other hand, if it is determined based on the detection result of the brake sensor 118 in step S155 that the brake operation is canceled, the control apparatus 100 determines that the vehicle is returned to the safe state (YES in step S155), and advances the process to step S160. Note that the determination of step S155 need not always be performed using the detection result of the brake sensor 118, and, for example, a detection result of a change in the vehicle speed or engine rotation speed based on an operation of stepping on the accelerator pedal can also be used.

In step S160, the control apparatus 100 determines whether the timer time set in step S145 has elapsed. If the timer time has not elapsed (NO in step S160), the process returns to step S150. As in the above-described processing, the control apparatus 100 executes panic neutral control in step S150, and determines in step S155 whether the vehicle is returned to the safe state. If the brake operation is canceled, and the timer time has elapsed, the control apparatus 100 determines to return the engaging mechanisms from the release state to the engaging state. That is, if the vehicle is returned to the safe state (YES in step S155), and the timer time set in step S145 has elapsed (YES in step S160), the control apparatus 100 advances the process to step S165.

In step S165, the control apparatus 100 controls the automatic transmission 1 to perform in-gear to the gear range at the time of panic neutral determination (step S140). The control apparatus 100 controls the engaging mechanisms so as to return to the gear range stored in the storage unit 102 based on the determination (YES in step S155, and YES in step S160) of the return. In step S140 described above, the information of the gear range during running is stored in the storage unit 102 at the time of panic neutral determination. For example, if the vehicle is running in the sixth range (6th), information representing the sixth range (6th) and information representing that the transmission clutches (C2, C2, and C3) as engaging elements are in the engaging state (FIG. 2A) are stored in the storage unit 102 as the information of the gear range during running. The control apparatus 100 sets the engaging mechanisms that constitute the gear range of the automatic transmission 1 to the engaging state so as to return to the gear range at the time of panic neutral determination (step S140) based on the information stored in the storage unit 102.

Note that the flowchart described with reference to FIGS. 7A and 7B exemplarily show the procedure of panic neutral control, and the execution order of the steps is not limited to the step order shown in FIGS. 7A and 7B. For example, the processing from step S140 can be executed after the process (processing of determining whether the determination condition of the deceleration for each state of the ABS device is satisfied) of step S125 without performing the processes of steps S130 and S135. Alternatively, the processing from step S140 can be executed after the processes of steps S125 and S130 without performing the process of step S135.

Summary of Embodiment

Arrangement 1. A control apparatus (for example, 100) according to the embodiment is a control apparatus (for example, 100) for an automatic transmission including a torque converter (for example, TC) with a lock-up clutch (for example, LC) capable of connecting an output shaft (for example, 2) of an engine (for example, EG) and an input shaft (for example, 10) of the automatic transmission (for example, 1), comprising:

a vehicle speed detection unit (for example, 116) configured to detect a vehicle speed of a vehicle;

a brake detection unit (for example, 118) configured to detect presence/absence of a brake operation;

a calculation unit (for example, S110, 100) configured to calculate a deceleration of the vehicle based on a change in the vehicle speed in a set time in a case in which the brake operation is detected;

a state determination unit (for example, S115, 100) configured to determine, based on an operation signal from an ABS device, whether the ABS device of the vehicle is in a normally operating state or in a fail state in which the ABS device does not normally operate;

a setting unit (for example, S120, 100) configured to set a reference deceleration according to the state of the ABS device;

a release determination unit (for example, S125, 100) configured to determine based on the deceleration and the reference deceleration whether to change an engaging state of an engaging mechanism that constitutes a set gear range of the automatic transmission to a release state when the brake operation is detected; and a control unit (for example, YES in S125, S150, NO in S125, 100) configured to control the engaging mechanism based on determination of the release determination unit (for example, S105, S125), wherein if the deceleration is larger than the reference deceleration (for example, DTV2) according to the fail state of the ABS device, the release determination unit (for example, S125, 100) determines to change the engaging state of the engaging mechanism to the release state (for example, YES in S125, 100), and if the deceleration is not more than the reference deceleration (for example, DTV2) according to the fail state, or if a reference deceleration (for example, DTV1) according to the normal state of the ABS device is set, the release determination unit determines to hold the engaging state of the engaging mechanism (for example, NO in S125, 100).

According to the embodiment of arrangement 1, when performing panic neutral control of changing the engaging state of engaging elements such as a transmission clutch, which constitute a gear range, at the time of panic brake determination to improve engine stall toughness, it is possible to perform panic neutral control based on a determination criterion set for each of the normal and abnormal states of the ABS device with a large influence on panic brake toughness.

According to the embodiment of arrangement 1, it is possible to control not to execute panic neutral control of releasing the engaging elements such as a transmission clutch and a brake in a case in which the ABS device 130 with high panic brake toughness normally operates. It is also possible to use panic neutral control only in the abnormal state of the ABS device 130 with low panic brake toughness. When it is determined, based on the state of the ABS device with a large influence on the panic brake toughness, whether to execute panic neutral control, control according to the state of the vehicle can be performed, and a vehicle with excellent marketability can be provided.

Arrangement 2. There is provided the control apparatus according to arrangement 1, wherein if the deceleration is larger than the reference deceleration according to the fail state of the ABS device (for example, YES in S125, 100), and the vehicle speed detected by the vehicle speed detection unit is not more than a reference vehicle speed (for example, YES in S130, 100), the release determination unit (for example, S125, 100) determines to change the engaging state of the engaging mechanism to the release state, and if the vehicle speed is higher than the reference vehicle speed (for example, NO in S130, 100), the release determination unit determines to hold the engaging state of the engaging mechanism.

According to the embodiment of arrangement 2, the condition of the vehicle speed is added as a criterion to determine whether panic neutral control is executable, and the automatic transmission 1 can be controlled not to execute panic neutral control in a running state with a high vehicle speed (vehicle running speed > reference vehicle speed VRF) without the necessity of panic neutral control.

Arrangement 3. There is provided the control apparatus according to arrangement 2, wherein if the vehicle speed detected by the vehicle speed detection unit is not more than the reference vehicle speed (for example, YES in S130, 100), and an engine rotation speed detected by an engine rotation speed detection unit is not more than a reference rotation speed (for example, YES in S135, 100), the release determination unit (for example, S125, 100) determines to change the engaging state of the engaging mechanism to the release state, and if the engine rotation speed is higher than the reference rotation speed (for example, NO in S135, 100), the release determination unit determines to hold the engaging state of the engaging mechanism.

According to the embodiment of arrangement 3, the condition of the engine rotation speed is added as a criterion to determine whether panic neutral control is executable, and the automatic transmission 1 can be controlled not to execute panic neutral control in a running state with a high engine rotation speed (engine rotation speed > reference rotation speed NERF) without the necessity of panic neutral control.

Arrangement 4. There is provided the control apparatus according to any one of arrangements 1 to 3, further comprising a storage unit (for example, 102) configured to store the set gear range of the automatic transmission and the engaging state of the engaging mechanism that constitutes the gear range when the brake operation is detected; and a time measuring unit (for example, 101) configured to measure a timer time, wherein if the brake operation is continued before the elapse of the timer time (for example, NO in S155, 100), the release determination unit determines to continue the state of the engaging mechanism controlled to the release state (for example, S150, 100), if the brake operation is canceled (for example, YES in S155, 100), and the timer time has elapsed (for example, YES in S160, 101), the release determination unit determines to return the engaging mechanism from the release state to the engaging state, and the control unit controls the engaging mechanism to return to the gear range stored in the storage unit based on the determination of return (for example, S165, 100).

According to the embodiment of arrangement 4, in a case in which the vehicle is returned to the safe state after panic neutral control is executed in the fail state of the ABS device, it is possible to control the automatic transmission 1 to perform in-gear to the gear range (S140) at the time of panic neutral determination. For example, even if the tires appear to stop rotating due to a panic brake, the vehicle may be actually moving if the road surface is wet in the rain or is frozen. In this case, for example, if the apparent vehicle speed is determined as zero, and the vehicle is returned to the first range (1st), the difference between the apparent vehicle speed and the actual vehicle speed becomes large, and a larger gear change shock may act on the automatic transmission. It is possible to do more smooth power transmission by controlling to perform in-gear to the gear range at the time of panic neutral determination.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus for an automatic transmission including a torque converter with a lock-up clutch capable of connecting an output shaft of an engine and an input shaft of the automatic transmission, comprising:
   a vehicle speed detection unit configured to detect a vehicle speed of a vehicle;
   a brake detection unit configured to detect presence/absence of a brake operation;
   a calculation unit configured to calculate a deceleration of the vehicle based on a change in the vehicle speed in a set time in a case in which the brake operation is detected;
   a state determination unit configured to determine, based on an operation signal from an ABS device, whether the ABS device of the vehicle is in a normally operating state or in a fail state in which the ABS device does not normally operate;
   a setting unit configured to set a reference deceleration according to the state of the ABS device;
   a release determination unit configured to determine based on the deceleration and the reference deceleration whether to change an engaging state of an engaging mechanism that constitutes a set gear range of the automatic transmission to a release state when the brake operation is detected; and a control unit configured to control the engaging mechanism based on determination of the release determination unit,
wherein if the deceleration is larger than the reference deceleration according to the fail state of the ABS device, the release determination unit determines to change the engaging state of the engaging mechanism to the release state, and
if the deceleration is not more than the reference deceleration according to the fail state, or if a reference deceleration according to the normal state of the ABS device is set, the release determination unit determines to hold the engaging state of the engaging mechanism.

2. The apparatus according to claim 1, wherein if the deceleration is larger than the reference deceleration according to the fail state of the ABS device, and the vehicle speed detected by the vehicle speed detection unit is not more than a reference vehicle speed, the release determination unit determines to change the engaging state of the engaging mechanism to the release state, and
if the vehicle speed is higher than the reference vehicle speed, the release determination unit determines to hold the engaging state of the engaging mechanism.

3. The apparatus according to claim 2, wherein if the vehicle speed detected by the vehicle speed detection unit is not more than the reference vehicle speed, and an engine rotation speed detected by an engine rotation speed detection unit is not more than a reference rotation speed, the release determination unit determines to change the engaging state of the engaging mechanism to the release state, and
if the engine rotation speed is higher than the reference rotation speed, the release determination unit determines to hold the engaging state of the engaging mechanism.

4. The apparatus according to claim 1, further comprising:
a storage unit configured to store the set gear range of the automatic transmission and the engaging state of the engaging mechanism that constitutes the gear range when the brake operation is detected during running; and
a time measuring unit configured to measure a timer time,
wherein if the brake operation is continued, the release determination unit determines to continue the state of the engaging mechanism controlled to the release state,
if the brake operation is canceled, and the timer time has elapsed, the release determination unit determines to return the engaging mechanism from the release state to the engaging state, and
the control unit controls the engaging mechanism to return to the gear range stored in the storage unit based on the determination of return.

* * * * *